United States Patent Office 3,477,116
Patented Nov. 11, 1969

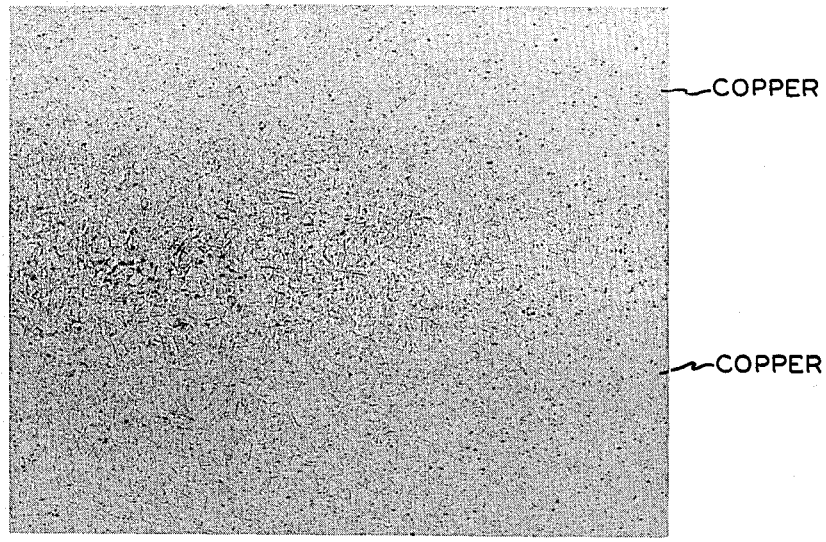
Fig-2-
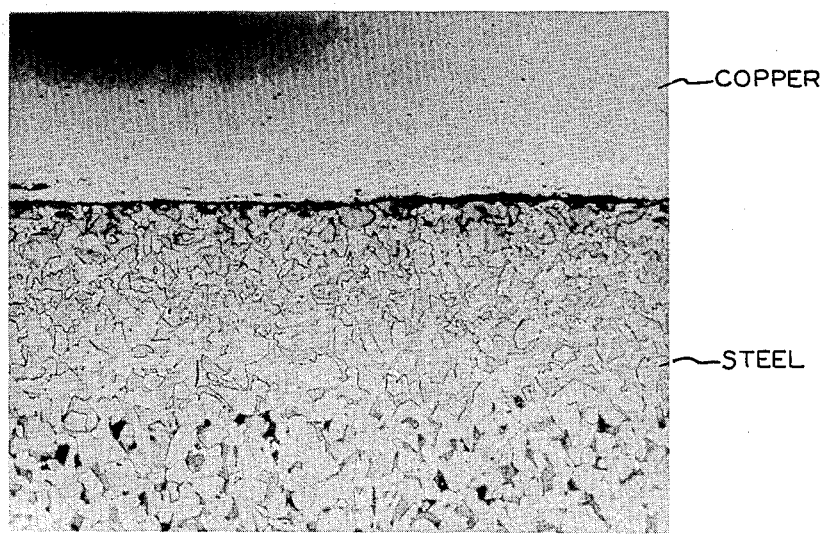
Fig-3-

3,477,116
WELDING HIGH HEAT CONDUCTIVE MATERIALS
Marion R. Calton, East Peoria, and Carl D. Weiss, Peoria, Ill., assignors to Caterpillar Tractor Co., Peoria, Ill., a corporation of California
Filed July 28, 1967, Ser. No. 656,924
Int. Cl. B23k 27/00, 35/24
U.S. Cl. 29—470.3                                          9 Claims

ABSTRACT OF THE DISCLOSURE

Welding high heat conductive materials, such as copper, bronze, brass, aluminum-bronze and other alloys containing a high percentage of copper, to each other and to other metals by the friction welding process including parameters for the welding of these materials.

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature whereupon the relative rotation subsides.

It is also to be understood that the invention is specifically applicable to the inertia welding process. In the inertia welding process the energy required to bring the common interface of the parts to a bondable condition is stored as kinetic energy in rotating inertial weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating inertial weights to a stop at the conclusion of the bonding cycle.

High heat conductive materials such as copper, bronze, brass and other alloys containing a high percentage of copper have a wide range of industrial uses. In many instances these high heat conductive materials are joined to each other or to another supporting member of a different material by methods such as brazing or a combination of mechanical lock and welding or brazing.

In the past it has been very difficult to obtain good welds with these materials by the friction bonding process. The difficulty of welding these materials undoubtedly ties in with the ability of the materials to rapidly absorb and conduct heat away from the weld interface, thereby causing work hardening of the material adjacent to the interface. When this happens, premature bonding occurs and insufficiently heated material outside of the heat affected zone is twisted and torn by the energy still stored in the rotating components.

It is the principal object of this invention to overcome these difficulties by supplying energy to the interface of the weld pieces at a rate sufficient to maintain a certain heat intensity over the entire interface. Such a process allows the yielding and flowing of material to be confined to the heat affected zone and a good weld may be accomplished.

From a number of attempts at friction welding high heat conducting materials of the type described herein, it has now been recognized that in order to supply energy to the weld interface at a sufficient rate, it is necessary to utilize high surface speeds, low axial loads, and relatively small flywheels. Through the utilization of high speeds and relatively small flywheels, the welding time is kept short (a weld time of 0.2 second is not uncommon) which eliminates excessive conduction of heat away from the interface and insures that the energy is put into the weld at a desirably high rate. The high rate of energy input insures that the entire interface is heated to maximum intensity in the shortest period of time. Moreover, the high speeds will generally produce low torque values which will eliminate twisting and deforming of the weld pieces.

Other objects and advantages of the present invention will be apparent from the following description and claims and are illustrated in the accompanying drawings which, by way of illustration, show preferred embodiments of the present invention and the principles thereof and what is now considered to be the best mode contemplated for applying these principles. It is recognized that other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIGS. 2 and 3 are photomicrographs illustrating specimens of high heat conducting materials which have been bonded by the method of the present invention.

DESCRIPTION OF THE PREFERRED EMBODIMENT

Figure 1:
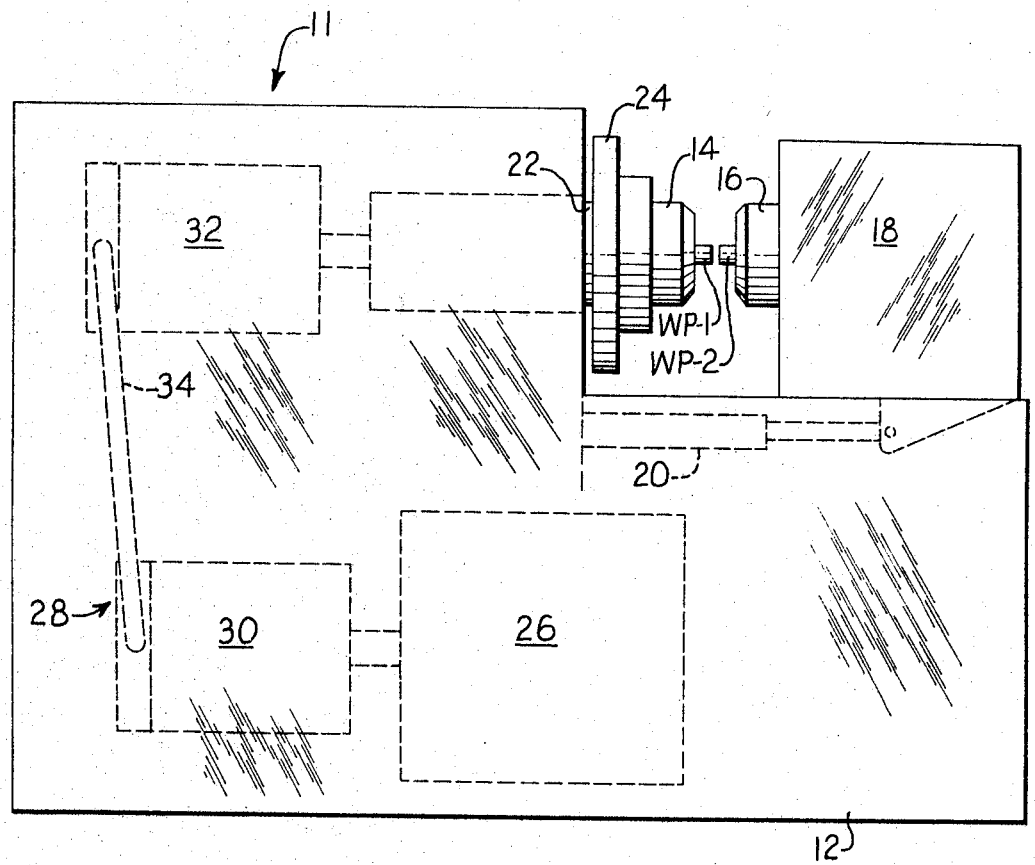
FIG. 1 is a side elevation, partly in section, illustrating one embodiment of a friction welding machine which may be used to practice the method of the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission indicated generally by the reference numeral 28. The hydrostatic transmission includes a hydrostatic pump 30, a hydrostatic motor 32, and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Patent No. 3,273,233 and as described in further detail below.

A welding operation to join a first workpiece such as a high heat conducting material to a second workpiece such as another high heat conducting material or other metal such as steel, for example, can be performed by operating the machine in the following general manner. One of the weld pieces WP-1 is firmly clamped in the rotatable chuck 14 located on the spindle 22. The other weld piece WP-2 is firmly clamped in the nonrotatable chuck 16 which is located on the tailstock portion 18 of the machine. Upon actuation of the motor 26, the flywheel and workpiece WP-1 are accelerated to a predetermined velocity.

Once the predetermined velocity has been obtained, the motor 26 is disconnected or shutdown and the ram mechanism 20 is actuated to move tailstock portion 18 and workpiece WP-2 into contact with the rapidly rotating workpiece WP-1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing the rotational velocity of the spindle member 22 has continued to decrease. At the time the rotation of the spindle ceases, upsetting has taken place and the weld is completed.

From the work done involving many samples and various test programs, parameter ranges have been established for the friction welding of high heat conducting materials to each other and to carbon alloy steels. These various test programs revealed that bronzes and brasses can be welded at surface velocities as low as 1500 feet per minute while pure copper to copper welds require 1800 feet per minute or higher. Good welds between copper and low carbon steel can also be made using a surface velocity of 1800 feet per minute or higher.

Many excellent welds have been made between copper, or copper alloys, and other materials, including steel and aluminum. All of the test programs illustrate that the copper alloys can be welded at lower surface velocities than pure copper. The following surface velocities are now considered to be minimum values for obtaining good welds for the following high heat conducting materials:

|  | Feet per minute |
|---|---|
| Bronze and brass | 1500 |
| Aluminum-bronze | 1650 |
| Copper | 1800 |

Other parameters which are necessary to consider in order to obtain good welds are the energy and load. In the past, the energy necessary to make a weld was thought of in terms of foot-pounds per square inch. The load or axial thrust needed to make a weld was thought of in terms of pounds per square inch. A more accurate method of determining energy and load requirements may now be used. This method utilizes a formula which correlates the required energy to (1) the diameter of the weld pieces; (2) the velocity in surface feet per minute; and (3) a material constant. This formula is:

$$E = C(\text{SFM})^{1/2} D^{2.5}$$

where:

E = energy required
C = material constant
SFM = velocity at the surface in feet per minute
D = maximum outside diameter.

Once the energy has been determined by use of the formula, the axial thrust load required is determined by using a load-energy ratio $(L/E)$, i.e., thrust load $= L/E$ ratio $\times E$. The load-to-energy ratio for copper, brass, bronze and aluminum-bronze is 0.3 to 0.4.

The energy formula also demonstrates that the material constant (C) is quite important. This material constant has been determined experimentally for a large number of materials. For the high heat conducting materials disclosed in this application the constants are as follows:

| Copper | 325–425 |
|---|---|
| Brass and bronze | 375–475 |
| Aluminum-bronze | 400–500 |

It will be readily understood that it is necessary to determine the correct material constant, as well as the acceptable surface velocity, in order to obtain good welds when using high heat conducting materials of the type disclosed herein.

FIGS. 2 and 3 show photomicrographs of what are considered to be very good welds for high heat conducting materials when welded by the friction welding process within the parameters comprising the present invention. FIG. 2 shows a copper to copper weld and FIG. 3 shows a copper to steel weld. The materials in the two exemplary photomicrographs of FIGS. 2 and 3 have been etched with a solution of ammonium hydroxide ($NH_4OH$) and hydrogen peroxide ($H_2O_2$), and both photomicrographs were taken at 100× magnification. The steel material in the photomicrograph of FIG. 3 has also been etched with a 1% nital solution (1% nitric acid and 99% alcohol). It should be observed that in FIG. 2 the weld line in the copper weld is not discernible.

We claim:

1. A method of friction welding metal workpieces wherein at least one of the workpieces is a high heat conducting workpiece containing a high percentage of copper comprising the steps of effecting relative rotation of the workpieces at speeds in excess of approximately 1500 surface feet per minute, forcing the workpieces into frictional engagement at their common interfaces under a predetermined axially applied pressure to effect an energy transfer at the interface which concentrates heat at the interface until a bond is formed and the relative rotation of the workpieces is stopped.

2. A method of friction welding metal workpieces wherein at least one of the workpieces is an aluminum-bronze workpiece comprising the steps of effecting relative rotation of the workpieces at speeds in excess of approximately 1650 surface feet per minute, forcing the workpieces into frictional engagement at their common interface under a predetermined axially applied pressure to effect an energy transfer at the interface which concentrates heat at the interface until a bond is formed and the relative rotation of the workpieces is stopped.

3. A method of friction welding brass or bronze workpieces comprising the steps of effecting relative rotation of the workpieces at speeds in excess of approximately 1500 surface feet per minute, forcing the workpieces into frictional engagement at their common interface under a predetermined axially applied pressure to effect an energy transfer at the interface which concentrates heat at the interface until a bond is formed and the relative rotation of the workpieces is stopped.

4. A method of friction welding pure copper to pure copper comprising the steps of effecting relative rotation of the workpieces at speeds in excess of approximately 1800 surface feet per minute, forcing the workpieces into frictional engagement at their common interface under a predetermined axially applied pressure to effect an energy transfer at the interface which concentrates heat at the interface until a bond is formed and the relative rotation of the workpieces is stopped.

5. A method of friction welding workpieces comprised of high heat conducting materials comprising the steps of effecting relative rotation of the workpieces, forcing the workpieces into frictional engagement at their common interface to effect an energy transfer at the interface which concentrates heat at the interface until a bond is formed at the interface and the relative rotation of the workpieces is stopped, said method including the step of determining the total input energy to be applied at the weld interface by the formula:

$$E = C \, (SFM)^{1/2} D^{2.5}$$

where:
E=energy required
C=material constant
SFM=velocity at the surface in feet per minute
D=maximum outside diameter.

6. A method of fraction welding a first workpiece to a second workpiece as set forth in claim 5 including using the following material constants (C):

| | |
|---|---|
| Copper | 325–425 |
| Brass and bronze | 375–475 |
| Aluminum-bronze | 400–500 |

7. A method of friction welding high heat conducting workpieces containing a high percentage of copper comprising the steps of effecting relative rotation of the workpieces at speeds in excess of approximately 1500 surface feet per minute, forcing the workpieces into frictional engagement at their common interface under an axial pressure of at least 3,000 pounds per square inch to effect an energy transfer at the interface which concentrates heat at the interface until a bond is formed and the relative rotation of the workpieces is stopped.

8. A method of friction welding high heat conducting workpieces containing a high percentage of copper comprising the steps of effecting relative rotation of the workpieces at speeds in excess of approximately 1500 surface feet per minute, forcing the workpieces into frictional engagement at their common interface using an energy input of at least 10,000 foot-pounds per square inch.

9. A method as set forth in claim 5 including determining the axial thrust load at which the workpieces are forced into engagement by using a load-to-energy ratio of 0.3 to 0.4.

References Cited
UNITED STATES PATENTS

| | | | |
|---|---|---|---|
| 3,126,625 | 3/1964 | Laing | 29—470.3 |
| 3,134,169 | 5/1964 | Hollander et al | 29—470.3 |
| 3,234,642 | 2/1966 | Hollander | 29—470.3 |
| 3,273,233 | 9/1966 | Oberle et al. | 29—470.3 |
| 3,346,947 | 10/1967 | Hollander | 29—470.3 |

JOHN F. CAMPBELL, Primary Examiner

U.S. Cl. X.R.

29—498